United States Patent [19]

Alexander, Jr. et al.

[11] Patent Number: 4,832,630

[45] Date of Patent: May 23, 1989

[54] MARINE TROLLING MOTOR WITH TRACTION DRIVE

[75] Inventors: Charles F. Alexander, Jr., Austin, Tex.; David A. Gussert, Oshkosh, Wis.

[73] Assignee: Brunswick Corporation, Skokie, Ill.

[21] Appl. No.: 126,780

[22] Filed: Nov. 30, 1987

[51] Int. Cl.$^4$ .............................................. B63H 5/13
[52] U.S. Cl. ........................................ 440/6; 440/75; 440/83; 74/785
[58] Field of Search .................... 440/6.7, 75, 83, 84, 440/86; 74/785, 786, 787, 788, 797, 802

[56] References Cited

U.S. PATENT DOCUMENTS

| | | | |
|---|---|---|---|
| 3,914,629 | 10/1975 | Gardiner | 440/6 |
| 3,999,500 | 12/1976 | Friedel et al. | 440/6 |
| 4,008,680 | 2/1977 | Alexander, Jr. | 440/6 |
| 4,009,677 | 3/1977 | Croisant | 440/6 |
| 4,051,802 | 10/1977 | Russell | 440/6 |
| 4,092,946 | 6/1978 | Kappas | 440/6 |
| 4,099,478 | 7/1978 | Alexander, Jr. | 440/6 |
| 4,305,012 | 12/1981 | Friedel | 440/6 |

OTHER PUBLICATIONS

"A Development of the Traction Roller System for a Gas Turbine Driven APU", Nakamura et al., SAE Technical Paper 790106, 1979, pp. 1-9.
"Traction Drives Roll Up Impressive Gains", Machine Design, Oct. 24, 1985, pp. 68-75.
"Automotive Traction Drive CVTs—An Overview", Hewko, SAE Paper 861355, 1986, pp. 195-207.
"Roller Traction Drive For Quiet, High Speed Power Transmission", Hewko, SAE Paper 690572, 1979, pp. 1-12.
"Metal-To-Metal Traction Drives Now Have A New Lease On Life", Yeaple, reprinted from Product Engineering, Oct. 1971.
"Traction Chain Drive Has Hydraulic Servo Ratio Control", Yeaple, Product Engineering, reprinted from Product Engineering, Oct. 1971.
"Traction Lubricant Increases Roller Drive Power Transmission", Soderholm, reprinted from Design News, Sep. 20, 1971.
"Lubricants For Traction Drives", Green et al., reprinted from Machine Design, May 2, 1974, pp. 1-7, Monsanto Industrial Chemicals Co.
"Santotrac: Synthetic Lubricants with 'Grip'", Monsanto Chemicals Co., pp. 1-32.

Primary Examiner—Sherman D. Basinger
Assistant Examiner—Stephen P. Avila
Attorney, Agent, or Firm—Andrus, Sceales, Starke & Sawall

[57] ABSTRACT

A marine trolling propulsion system (2) has a lower submerged housing (4) including an electric motor (5) driving a propeller (6) through a reducing traction drive provided by rolling contact of three balls (57-59) between split inner races (36 and 38) and an outer race (60) to drive a transfer member (68) which rotates the propeller (6). The inner race halves (36 and 38) are axially loaded by Belleville washers (72) providing constant axial force with axial deflection, and a limited maximum loading force capability to intentionally provide overload slip protection. The inner race halves (36 and 38) are keyed to the intermediate floating shaft (14) on raised hexagonal shoulders (32 and 34) permitting rocking of the inner race halves (36 and 38) and self-seating and alignment of the inner race halves to the balls (57-59). Couplers (16 and 124) are provided between the electric motor shaft (12) and an intermediate floating axial shaft (14) and between the transfer member (68) and the propeller shaft (70) which enable different axes of rotation to accommodate manufacturing variations. The transfer member (68) is also coupled to the propeller shaft (70) by structure (118, 126, 128) enabling the transfer member (68) to rock about the center of the propeller shaft (70) such that propeller thrust is transmitted equally to the balls (57-59).

55 Claims, 4 Drawing Sheets

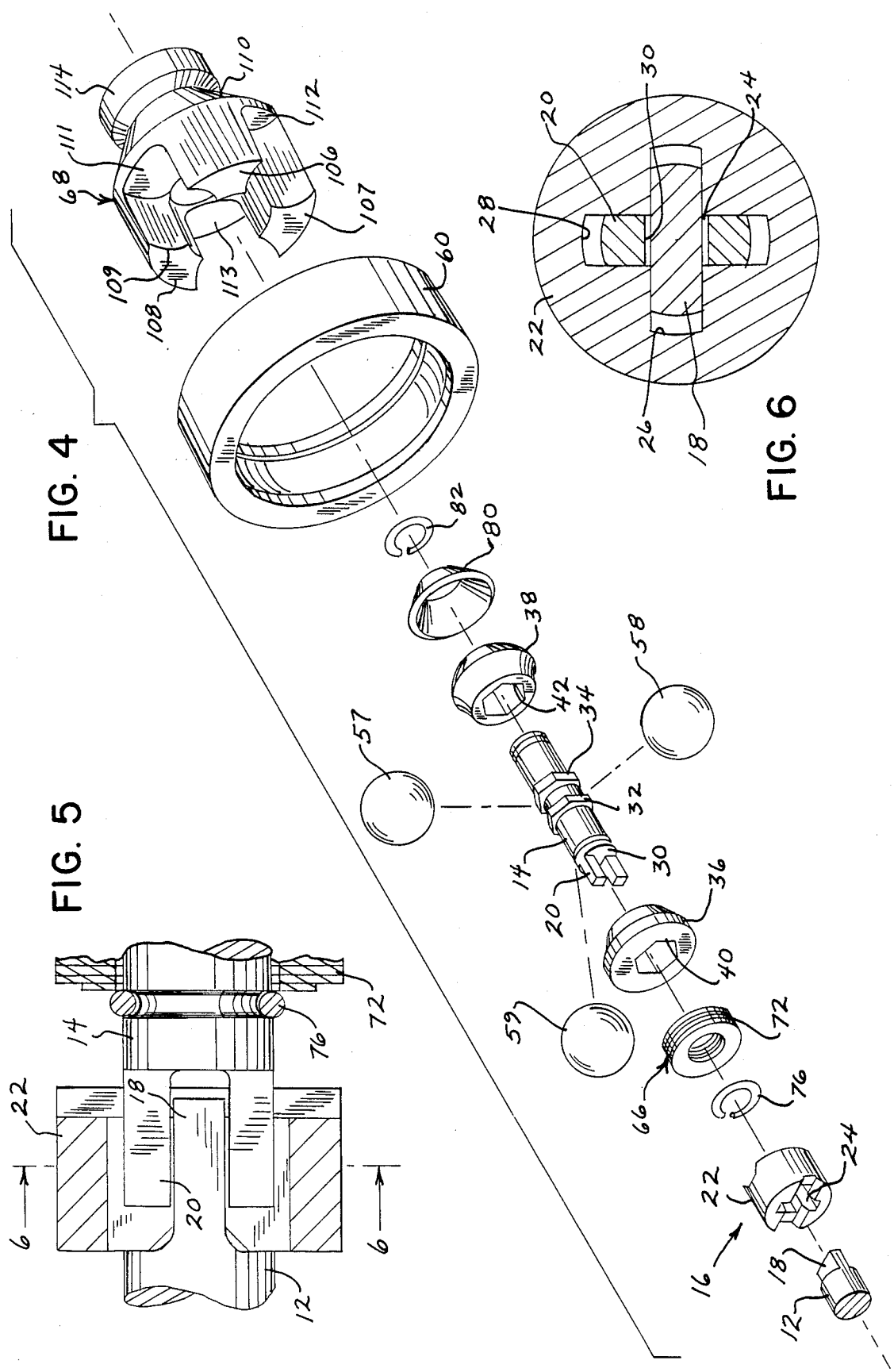

MARINE TROLLING MOTOR WITH TRACTION DRIVE

BACKGROUND AND SUMMARY

The invention arose during further development efforts regarding marine trolling motors as shown in U.S. Pat. Nos. 4,009,677, 4,099,478 and 4,305,012, incorporated herein by reference.

In the art of marine trolling propulsion, a small electric driven outboard motor unit is mounted to the bow or transom of a boat and employed for slow speed maneuverability and positioning for fishing. The electric drive motor is housed within a lower submerged housing unit and coupled to drive a suitable trolling propeller. A separate high power internal combustion outboard motor is normally provided for rapid propulsion of the boat to the fishing location, after which the trolling motor is employed. For trolling, thrust from the trolling propeller is first transferred from the propeller to the electric trolling motor housing and then to the boat.

Electric trolling motors are often designed to operate from a conventional 12 volt battery. Higher thrust units operating from a 24 volt supply are available, but require two 12 volt batteries. A direct drive connection of the electric motor to the propeller provides a simple and reliable trolling motor with minimal cost. However, direct drive is subject to an inherent trade-off in efficiency because the motor has an optimum operating speed which is higher than that of the trolling propeller.

The above noted patents show planetary gear reduction systems for driving a large diameter low rpm trolling propeller from a higher rpm electric trolling motor. The large slower turning trolling propeller is more efficient in producing thrust at low boat speeds than high speed propellers. The larger trolling propeller requires more torque to turn it, which torque is provided by the gear reduction between the motor and the propeller.

In the present invention, a marine trolling propulsion system is provided with a traction drive speed reducer between the motor and propeller. Gears and gear teeth noise are eliminated, and replaced by rolling contact.

The invention is particularly advantageous in various design features which facilitate low manufacturing cost. The design inherently accommodates tolerance deviations in those members providing the loading of the rolling contact members. There is particular tolerance of axial deviations affecting radial loading of traction rollers. There is also tolerance in various members for movement transverse to the axis of rotation.

The design enables different axes of rotation of the propeller shaft and the electric motor drive shaft such that such shafts do not have to be exactly aligned. The design enables a floating intermediate shaft which self-seats and tracks the rollers, without being constrained to align with either the input drive shaft from the electric motor or the propeller shaft. Inner race structure is keyed to the floating intermediates shaft and is designed to rock about such shaft transversely to the axis of rotation to equalize contact loading and to enable the inner race structure to self-seat and take its alignment from the rollers. The elimination of the alignment requirements of the rotating shafts eliminates concerns of binding and the strict manufacturing tolerances otherwise required to prevent same, including the attendant high machining costs, etc.

The design provides overload slip protection enabling the electric motor drive shaft to keep rotating even if the propeller is momentarily stopped, e.g. upon striking a stump, whereby to avoid mechanical breakage within the drive. In addition, uniform loading of the normal contact force on the rollers is provided by applying substantially constant axial force versus axial deflection. This reduces manufacturing cost, provides increased and uniform life by avoiding overly loaded rollers, provides uniform overload slip capability, and accommodates mechanical wear without a reduction of the radial loading of the rollers.

In the preferred embodiment, planet cage structure locates off a three roller ball pattern. The planet cage structure is also designed for limited rocking about a point on the propeller shaft center to ensure equal division of roller contact loading from propeller thrust, and to transmit propeller thrust through the traction rollers and outer race to the housing structure without a separate thrust bearing. In combination with above noted rocking inner race structure, this further provides uniform and equally distributed roller contact engagement.

BRIEF DESCRIPTION OF THE DRAWINGS

FIG. 4 is an exploded isometric view of a portion of the structure in FIG. 2. FIG. 5 is an enlarged partial sectional view of a portion of the structure in FIG. 2.

FIG. 6 is a sectional view taken along line 6—6 of FIG. 5.

DETAILED DESCRIPTION

Figure 1:
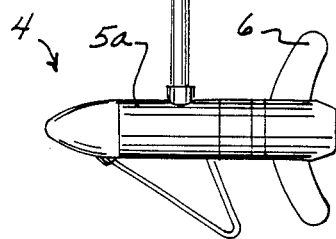
FIG. 1 is a side elevation view of a marine trolling propulsion system.
Figure 2:
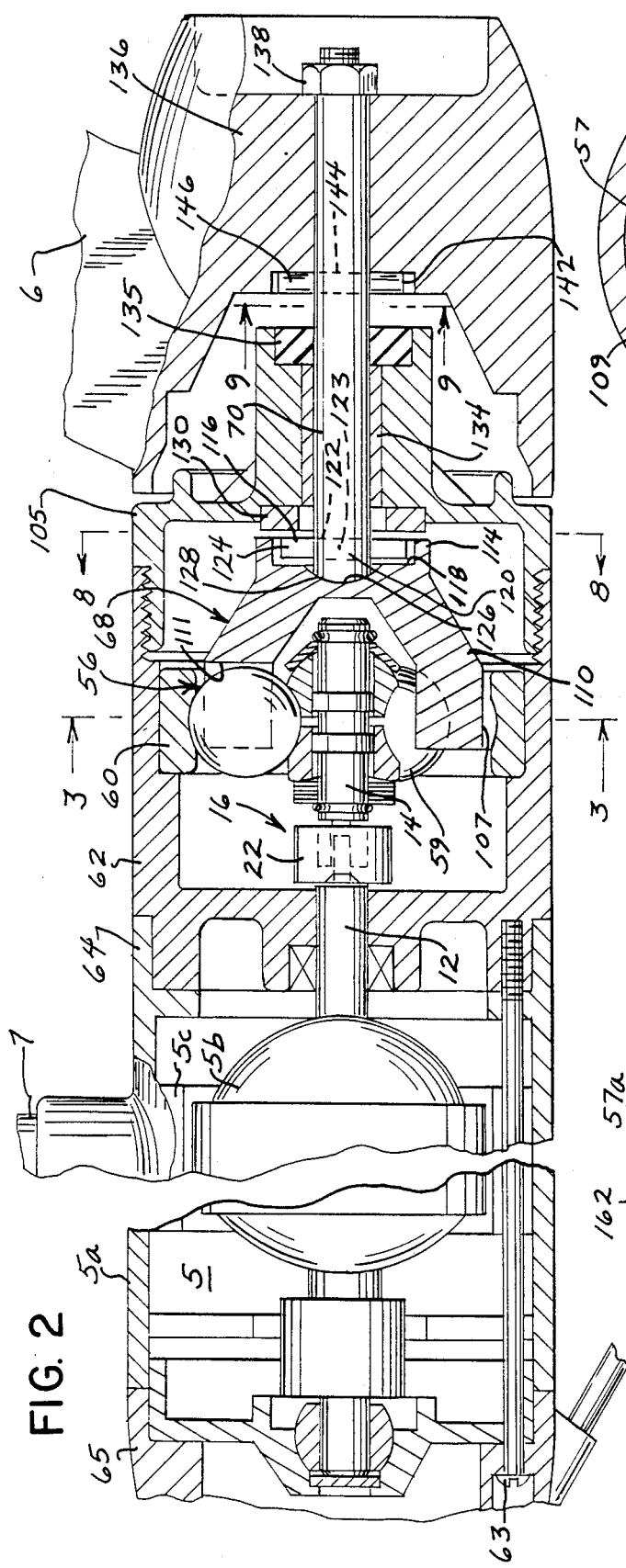
FIG. 2 is a partial sectional view of the lower housing unit in FIG. 1.
Figure 3:
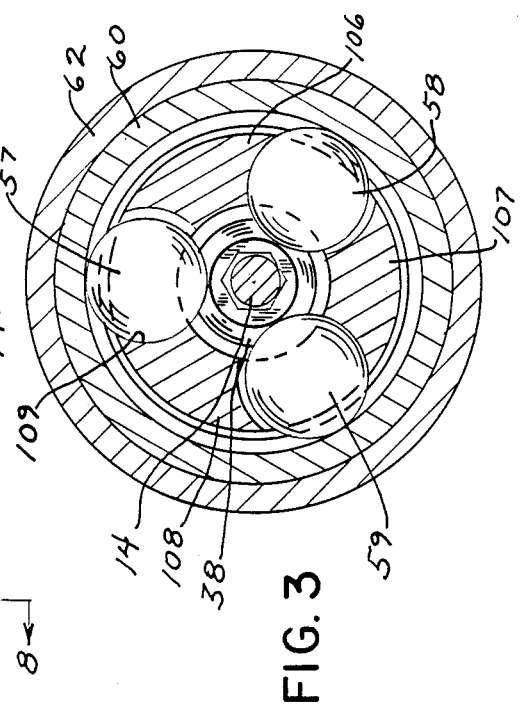
FIG. 3 is a sectional view taken along line 3—3 of FIG. 2.

FIG. 1 is similar to FIG. 1 of incorporated U.S. Pat. No. 4,099,478, and shows a marine propulsion trolling system 2. Generally, a boat for bass fishing and the like includes a forward horizontal deck to which the trolling system is pivotally secured. The trolling system has a lower submerged housing unit 4 having an electric motor 5, FIG. 2, including motor housing 5a, rotary armature 5b coupled to drive trolling propeller 6, and permanent magnets 5c. Lower housing unit 4 is secured to the lower end of a support tube member 7 which in turn is suitably rotatably journaled in swivel tube support 8 which terminates at the upper end within a steering head 9. Swivel tube 8 is connected to pivotal mount assembly 10. Motor 5 is selectively energized from within the boar to vary the speed of propeller 6 and thereby the propulsion force, and tube 7 is pivoted within swivel tube support 8 to turn the boat. Pivot assemblies and supports for trolling motors are shown in U.S. Pat. Nos. 3,999,500, 4,008,680 and 4,051,802, incorporated herein by reference.

Electric motor 5 drives rotary drive shaft 12 which in turn drives rotary intermediate floating shaft 14. Coupler 16 couples drive shaft 12 to intermediate floating shaft 14 and enables different axes of rotation of shafts 12 and 14 such that these shafts need not be exactly aligned. This reduces manufacturing cost and eliminates concerns with binding. Drive shaft 12 has a screw driver flat head tip configuration 18, FIGS. 4 and 5. Intermediate floating shaft 14 has a notched screw driver flat head tip configuration 20. Coupler 16 is an outer cylindrical shell 22 having a cross-shaped aperture 24 with perpendicular crossed slots 26 and 28 therethrough, FIG. 6. Flat head tip 18 is loosely received in cross slot 26, and flat head tip 20 is loosely received in cross slot 28. Central notch 30 of tip 20 receives flat head tip 18 therein, to reduce overall axial length. This overlap and reduction of axial length is shown in FIG. 5. Alternatively, tip 18 can be notched. Further alternatively, neither tip is notched if the extra axial length is not objectionable. Rotation of drive shaft 12 drives shell 22 to rotate the shell which in turn drives intermediate floating shaft 14. The looseness of flat head tips 18 and 20 in respective cross slots 26 and 28 permits movement transverse to the axes of rotation of shafts 12 and 14 such that shafts 12 and 14 need not be exactly aligned.

Figure 7:
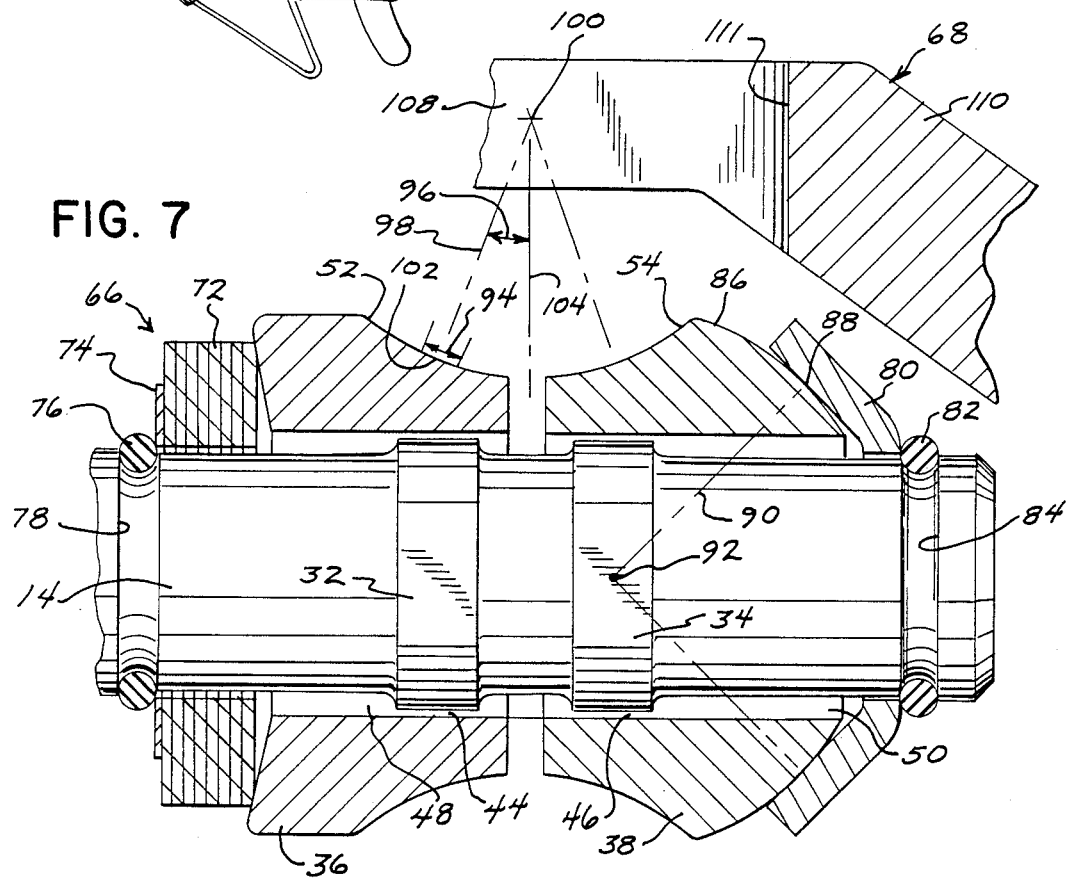
FIG. 7 is an enlarged partial sectional view of a portion of the structure in FIG. 2.

Shaft 14 has a pair of axially spaced raised shoulders 32 and 34, FIGS. 4 and 7, of increased outer diameter and of a keyed configuration such as hexagonal. Split inner race structure is provided by axially spaced race halves 36 and 38 around shaft 14 and having respective inner diameters 40 and 42 with hexagonal configurations keyed to respective shoulders 32 and 34 and driven thereby such that rotation of shaft 14 drivingly rotates race halves 36 and 38. Race halves 36 and 38 slide over and are received on shoulders 32 and 34 with respective clearance gaps 44 and 46, FIG. 7, to enable rocking of race halves 36 and 38 about shoulders 32 and 34 transversely to the axis of rotation of axial shaft 14. The limit of rocking is also determined by respective gaps 48 and 50 between respective inner diameters 40 and 42 of the race halves and shaft 14.

Inner race halves 36 and 38 have curved respective bearing surfaces 52 and 54 engaging planet roller means 56 provided by three rollers or balls 57, 58 and 59 equally spaced therearound. The three balls 57–59 are driven by rolling contact with inner race halves 36 and 38 on shaft 14. The driven balls roll against an outer race 60 which is concentric to the balls and is fixed to housing portion 62 by press fit. Housing portion 62 is partially telescopically received in motor housing portion 64 and fixed thereto by through bolts, one of which is shown at 63. The bolts also attach nose cone 65 to motor housing 5a.

The shorter the axial gap between inner race halves 36 and 38, the greater the radially outward loading of balls 57–59 against outer race 60. Axial loading means 66 is provided for applying an axial force along shaft 14 urging race halves 36 and 38 towards each other to in turn urge balls 57–59 radially outwardly against outer race 60. This axial loading means preferably has a limited maximum loading force capability to intentionally provide overload slip protection to enable shafts 12 and 14 to continue to rotate even if rotation of planet carrier cage 68, to be described, and rotary driven output propeller shaft 70 is stopped. The continued rotation is enabled by sliding rather than rolling contact of balls 57–59 with inner races 36 and 38 or outer race 60.

In the preferred embodiment, axial loading is provided by one or more Belleville spring washers 72, FIG. 7, around shaft 14 and bearing on one side against retainer washer 74 stopped against snap ring 76 in annular groove 78 in shaft 14, and bearing on the other side against race half 36. The other race half 38 engages and is stopped against stamped frusto-conical washer 80 which is stopped against snap ring 82 in annular groove 84 in shaft 14. Washer 80 extends partially radially away from shaft 14 and partially axially toward the race halves to engage an outer curved spherical surface 86 of race half 38 along a tangent 88 having a perpendicular force vector 90, dashed line, FIG. 7, intersecting the center 92 of shaft 14 at shoulder 34, such that race half 38 rocks about shoulder 34 without causing axial movement of washer 80 and self-seats to balls 57–59 to provide uniform rolling contact force and accommodate tolerance deviations.

Belleville spring washers are preferred because they can be proportioned to apply a substantially constant axial force over a range of axial deflection, which is a known property of such washers. Belleville spring washers permit some cocking of race half 36 to equalize contact load on the balls. The constant axial force over a range of axial deflection provided by the Belleville spring washers is desirable to accommodate axial tolerance deviations of the components and their location and the machining required for grooves such as 78 and 84, all without substantially altering the radial loading of balls 57–59. This accommodation of axial tolerance deviations reduces manufacturing cost. This also provides increased and uniform life by avoiding overloading of balls 57–59. This also provides uniform overload slip capability. This also accommodates mechanical wear over the life of the system without a reduction of the radial loading of balls 57–59. Race halves 36 and 38 take their alignment from balls 57–59 and can rock about shoulders 32 and 34 accordingly. Shaft 14 takes its alignment from the position of race halves 36 and 38. Coupler 16 permits angular misalignment of shaft 14 relative to shaft 12. Such structure further permits axial nonregistry of shafts 14 and 12.

Each of balls 57–59 engages each of inner race halves 36 and 38 along curved bearing surfaces 52 and 54 and slightly elastically deforms over a given deformation length therealong, as shown at 94, FIG. 7. An angle of engagement 96 is defined by a first line 98 drawn from the center 100 of the ball to the center 102 of elastic deformation length 94, and a second line 104 extending from the center 100 of the ball radially perpendicularly relative to shaft 14. The angle of engagement 96 is preferably about 20°, though it can be in the range of about 5° to 30°. An angle of engagement greater than 30° is not preferred because of loss of speed reduction capability. An angle of engagement less than 5° is not preferred because dimensions and tolerances become too critical to manufacture. As the contact points on the inner race halves 36 and 38 come closer together with smaller angle of engagement, so do the hexagonal drive shoulders 32 and 34, which in turn reduces directional control of shaft 14 resulting in increased wobble of the axial ends of shaft 14.

The center of elastic deformation engagement 102 is substantially radially aligned with shoulder 32 on shaft 14. The center of elastic deformation of each of balls 57–59 with race half 38 is likewise radially aligned with shoulder 34. The three balls 57–59 engage the two inner race halves 36 and 38 at six contact points with equally distributed contact pressure among the six points.

Housing section 105 is threadingly mounted to housing section 62 and closes a cavity therein which is filled with traction fluid, such as outboard motor gear oil to provide elastohydrodynamic lubrication. Another traction fluid is that sold under the name Santotrac by Monsanto Industrial Chemicals Company. It is preferred that the traction fluid include extreme pressure (EP) additives, "Lubricants For Traction Drives", Machine Design, May 2, 1974, page 7, Monsanto Industrial Chemicals Company. The EP additives are preferred to prevent galling of the rolling contact surfaces when sliding due to overload. In the preferred embodiment, intentional overload slip capability is provided.

Figure 8:
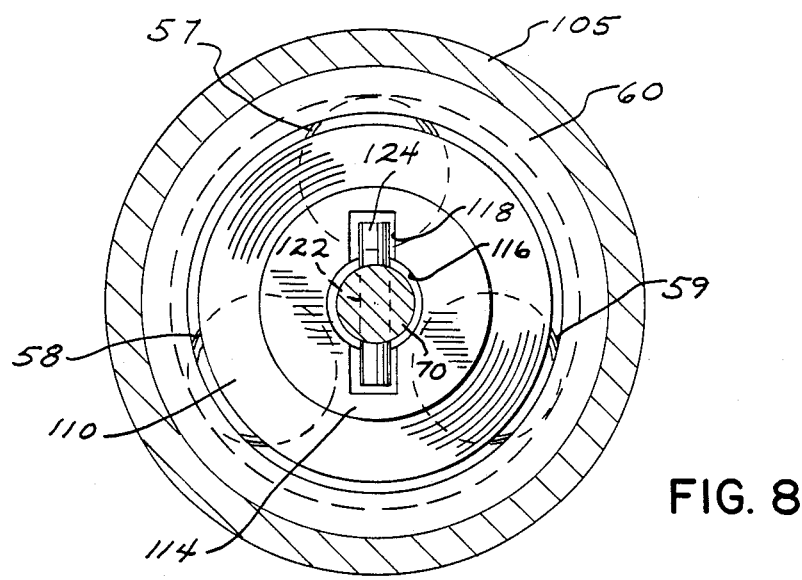
FIG. 8 is a partial sectional view taken along line 8—8 of FIG. 2.

Planet cage 68 has three fingers 106, 107 and 108 extending axially between adjacent respective balls 57 and 58, 58 and 59, and 59 and 57. Each finger has sides which are curved, as shown at 109, to approximately the same curvature as the roller ball and which engage a respective roller ball. Planet cage 68 is located and positioned by balls 57–59, i.e. cage 68 takes its location from balls 57–59. As balls 57–59 roll along the inner and outer races, the balls slidingly engage and drive the sides of the cage fingers 106–108 to rotate cage 68 about shaft 14. Fingers 106–108 are joined by a central hub 110 having three abutment surfaces 111, 112 and 113 between adjacent respective fingers and each engaging a respective ball 57–59 for transmitting thrust. Hub 110 is frusto-conically tapered and then radially enlarged at axial end 114. Axial end 114 has an axial opening 116, FIG. 8, with a radial slot 118 extending radially outwardly from axial opening 116. Axial end 120 of propeller shaft 70 has a radial aperture 122 therethrough through which extends a transverse pin 124 extending radially from axial shaft 70 and loosely into radial slot 118 in cage 68. Rotation of cage 68 drives pin 124 and propeller shaft 70. Cage 68 acts as a transfer member to transfer rotation of shaft 14 and balls 57–59 to rotation of propeller shaft 70. The looseness of pin 124 in radial slot 118 permits rocking of cage 68 about center 123 of propeller shaft 70 at pin 124 such that cage 68 and propeller shaft 70 can be angularly misaligned.

Axial opening 116 in cage 68 has an inner rounded spherical abutment surface 126. Axial end 120 of propeller shaft 70 has a rounded spherical end face 128 engaging rounded abutment surface 126 such that cage 68 may rock about the center 123. Preferably the clearance between the balls 57–59 and cage 68 is small enough to limit the rocking of cage 68, to eliminate any potential binding between the parts, while providing running clearance between the parts. It is preferred that the cage movement be limited by the balls when at rest or in reverse. In other alternate embodiments, planet cage structure 68 can be loosely piloted on the inner diameter of outer race 60, or on the outer diameter of inner race 36, 38 or can be fixed to propeller shaft 70. In any event, during forward operation the clearance between the piloting surfaces will eliminate unnecessary friction while preventing excess rocking of cage 68 when the device is not running or is in reverse. Propeller thrust is transmitted to cage 68 at thrust surface 126 and in turn transmitted by abutment surfaces 111–113 to balls 57–59 near the axis of rotation to minimize friction, and to outer race 60, without a separate thrust bearing for absorbing such propeller thrust. This provides an efficient forward thrust bearing without the cost of a separate antifriction bearing. Thrust in the reverse direction is absorbed by pin 124 against thrust washer bearing 130 in housing section 105. Housing section 105 includes a bushing 134 for supporting propeller shaft 70 and absorbing side shock loads on the propeller shaft, and is sealed by lip seal 135.

Figure 9:
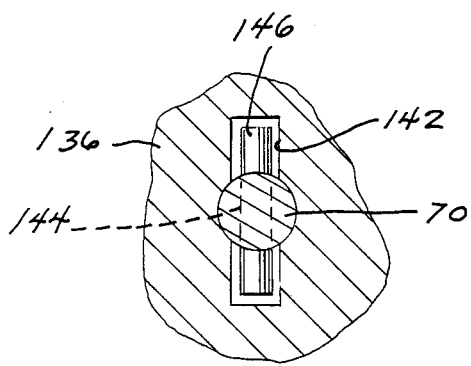
FIG. 9 is a partial sectional view taken along line 9—9 of FIG. 2.

Propeller 6 is mounted at hub 136 to propeller shaft 70 by nut 138. Hub 136 is supported directly on shaft 70. Hub 136 has a radial slot 142, FIGS. 2 and 9. Shaft 70 has a radial aperture 144 therethrough through which extends a transverse pin 146 extending radially from axial shaft 70 into radial slot 142 in hub 136. Rotation of shaft 70 drives pin 146 and hub 136 to rotate propeller 6.

In the preferred embodiment, the invention enables the use of a propeller without a rubber insert in the hub. In typical prior applications, a rubber hub is inserted into a bore in the propeller. The outer diameter of the rubber hub insert frictionally drives the propeller, but will deflect or slip at a given overload, to protect the propeller if it should strike a stump or the like. However, the stiffness of the rubber insert varies, which in turn varies contact pressure, and hence the torque at which slip will occur. Furthermore, as the rubber ages, it sometimes bonds to the material of the propeller, such as aluminum, and won't slip. The present invention enables elimination of these problems by eliminating the need for a rubber hub insert.

Figure 10:
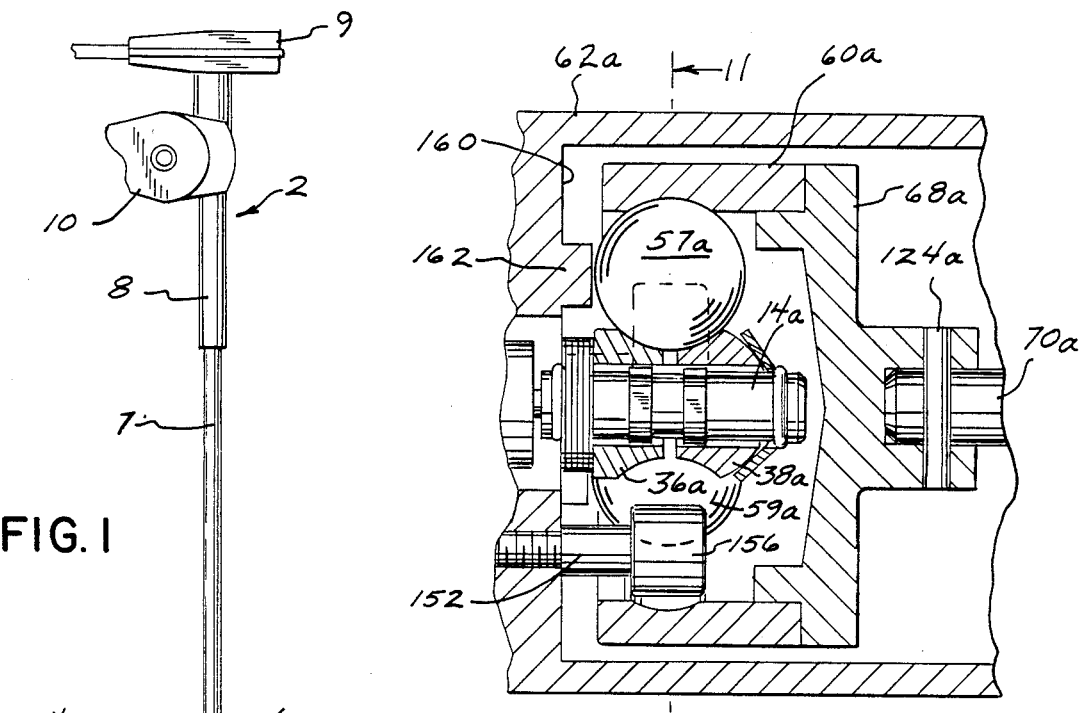
FIG. 10 is a partial sectional view showing an alternate embodiment of a portion of FIG. 2.
Figure 11:
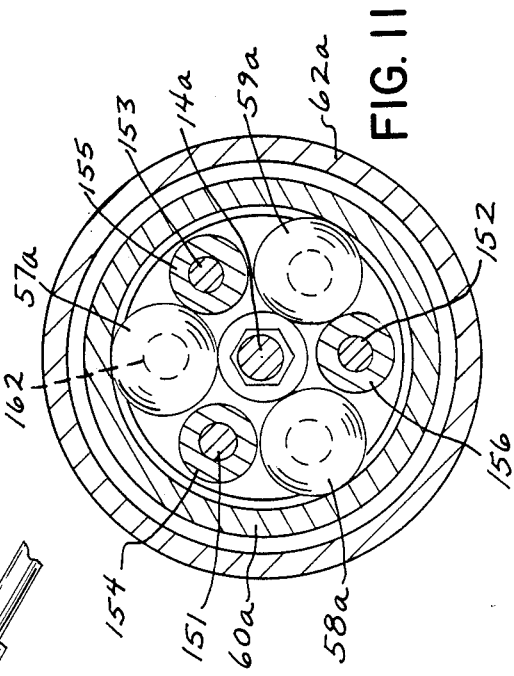
FIG. 11 is a sectional view taken along line 11—11 of FIG. 10.

In an alternate embodiment, FIGS. 10 and 11, outer race 60a is fixed to transfer member 68a to rotate therewith. Transfer member 68a drives pin 124a and propeller shaft 70a. Stops in the form of bolts 151, 152 and 153, FIG. 11, are threaded into housing 62a and provide a cage holding balls 57a–59a against orbiting about central intermediate floating axial shaft 14a. Balls 57a–59a are in rolling contact with inner races 36a and 38a and outer race 60a, but do not orbit about shaft 14a. Bolts 151–153 are provided with respective roller bearings 154, 155 and 156 therearound for engagement with the rolling balls 57a–59a, allowing the balls to spin about respective spin axes parallel to axial shaft 14a. Housing portion 62a includes three integral thrust pads, one of which is shown at 162, FIG. 10, for engaging and stopping respective balls 57a–59a and absorbing the thrust from the center of the ball. The embodiment in FIGS. 10 and 11 reverses the direction of rotation.

In another alternate embodiment, axles replace fingers 106–108, and roller bearings or needle bearings are provided therearound to further reduce friction, though such embodiment does increase cost.

In another alternative, variable axial loading clamping force may be applied to urge inner race halves 36 and 38 towards each other in proportion to transmitted torque, for example by a screw or cam which provides increasing axial force with increasing motor torque. Overload slip protection may be provided in this embodiment with a preloaded spring that will deflect to limit the maximum applied load.

Roller balls 57–59 are preferably a steel ball bearing type material, hardened to 60 Rockwell C or higher. Races 36, 38 and 60 should likewise be bearing quality steel of equal hardness. Cage 68 is plastic of suitable strength and should have some bearing qualities for roller ball engagement, for example nylon.

It is recognized that various equivalents, alternatives and modifications are possible within the scope of the appended claims.

We claim:

1. An outboard marine propulsion system having a lower submerged housing including an electric motor, comprising:
   rotary drive shaft means in said housing and driven by said electric motor;
   rotary propeller shaft means in said housing and carrying a propeller;
   speed reducing traction drive means in said housing and coupled between said drive shaft means and said propeller shaft means for driving said propeller to rotate at a lower speed than said electric motor;
   axial loading means applying an axial force along said drive shaft means against said traction drive means and having a limited maximum loading force capability to intentionally provide overload slip protection to enable said electric motor and drive shaft means to continue to rotate even if rotation of said propeller and propeller shaft is stopped, said continued rotation being enabled by sliding rather than rolling contact of said traction drive means due to said limited maximum loading force capability of said axial loading means.

2. The invention according to claim 1 wherein said traction drive means comprises:
   inner race means on said rotary drive shaft means;
   planet roller means around said drive shaft means and driven by rolling contact with said inner race means;
   transfer means driven by said roller means to rotate about said drive shaft means, and operatively coupled to said propeller shaft means;
   outer race means fixed to one of said housing and said transfer means and concentric to and engaged by said roller means in rolling contact therewith.

3. The invention according to claim 2 wherein said outer race means is fixed to said housing, and said transfer means comprises a planet carrier cage rotating with said planet roller means around said drive shaft means.

4. The invention according to claim 2 wherein said outer race means is fixed to said transfer means, and comprising planet carrier cage means fixed to said housing and holding said roller means stationary around said rotary drive shaft means and permitting said rolling contact with said inner race means.

5. An outboard marine propulsion system having a lower submerged housing including an electric motor, comprising:
   rotary drive shaft means in said housing and driven by said electric motor;
   rotary propeller shaft means in said housing and carrying a propeller;
   speed reducing traction drive means in said housing and coupled between said drive shaft means and said propeller shaft means for driving said propeller to rotate at a lower speed than said electric motor;
   wherein said traction drive means comprises:
   inner race means on said rotary drive shaft means;
   planet roller means around said drive shaft means and driven by rolling contact with said inner race means;
   transfer means driven by said roller means to rotate about said drive shaft means, and operatively coupled to said propeller shaft means;
   outer race means fixed to one of said housing and said transfer means and concentric to and engaged by said roller means in rolling contact therewith,
   and wherein said inner race means comprises first and second axially spaced inner race halves on said drive shaft means and applying increasing radial loading of said roller means against said outer race means with decreasing axial separation of said first and second inner race halves, and comprising axial loading means applying an axial force along said drive shaft means urging said first and second inner race halves towards each other to in turn urge said roller means radially outwardly against said outer race means, said axial loading means having a limited maximum loading force capability to intentionally provide overload slip protection to enable said electric motor and drive shaft means to continue to rotate even if rotation of said propeller and propeller shaft is stopped, said continued rotation being enabled by sliding rather than rolling contact of said roller means due to said limited maximum loading force capability of said axial loading means providing limited maximum radial loading of said roller means.

6. The invention according to claim 5 wherein said axial loading means comprises means applying substantially constant axial force versus axial deflection to accommodate axial tolerance deviations without substantially altering the radial loading of said roller means, to reduce manufacturing cost, to provide increased and uniform life by avoiding overly loaded roller means, to provide uniform overload slip capability, and to accommodate mechanical wear without a reduction of the radial loading of said roller means.

7. An outboard marine propulsion system having a lower submerged housing including an electric motor and driving a propeller through a reducing traction drive comprising:
   rotary input shaft means in said housing and rotated by said electric motor;
   rotary intermediate shaft means in said housing;
   rotary propeller shaft means in said housing and rotating said propeller;
   first coupling means coupling said input shaft means to said intermediate shaft means such that said input shaft means drives said intermediate shaft means and enables different axes of rotation of said input and intermediate shaft means such that said input and intermediate shaft means need not be exactly aligned;
   planet roller means around said intermediate shaft means and driven by rolling contact therewith;
   transfer means driven by said roller means to rotate about said intermediate shaft means;
   second coupling means coupling said propeller shaft means to said transfer means such that said transfer means drives said propeller shaft means and enables angular misalignment of said transfer means and said propeller shaft means,
   wherein said intermediate shaft means comprises an intermediate floating axial shaft roughly aligned with and axially spaced between said input shaft means and said propeller shaft means,
   and comprising outer race means fixed to one of said housing and said transfer means and concentric to and engaged by said roller means in rolling contact therewith;
   and wherein said intermediate shaft means further comprises first and second inner race halves keyed to and driven by said floating axial shaft and axially spaced along said floating axial shaft and having curved bearing surfaces engaging said roller means in rolling contact therewith and applying increasing radially outward loading of said roller means against said outer race means with decreasing axial separation between said first and second inner race halves;

and comprising axial loading means applying an axial force along said floating axial shaft urging said first and second inner race halves towards each other to in turn urge said roller means radially outwardly against said outer race means, said axial loading means having a limited maximum loading force capability to intentionally provide overload slip protection to enable said input shaft means and said floating axial shaft to continue to rotate even if rotation of said propeller shaft means is stopped, said continued rotation being enabled by sliding rather than rolling contact of said roller means.

8. The invention according to claim 7 wherein said axial loading means comprises one or more Belleville washers around said intermediate floating axial shaft and bearing on one side against stop means on said floating axial shaft and bearing on the other side against said first inner race half and applying a substantially constant axial force with axial deflection to accommodate axial tolerance deviations without substantially altering the radial loading of said roller means, to reduce manufacturing cost, to provide increased and uniform life by avoiding overly loaded said roller means, to provide uniform overload slip capability, and to accommodate mechanical wear without a reduction of the radial loading of said roller means.

9. An outboard marine propulsion system having a lower submerged housing including an electric motor and driving a propeller through a reducing traction drive comprising:
rotary input shaft means in said housing and rotated by said electric motor;
rotary intermediate shaft means in said housing;
rotary propeller shaft means in said housing and rotating said propeller;
first coupling means coupling said input shaft means to said intermediate shaft means such that said input shaft means drives said intermediate shaft means and enables different axes of rotation of said input and intermediate shaft means such that said input and intermediate shaft means need not be exactly aligned;
planet roller means around said intermediate shaft means and driven by rolling contact therewith;
transfer means driven by said roller means to rotate about said intermediate shaft means;
second coupling means coupling said propeller shaft means to said transfer means such that said transfer means drives said propeller shaft means and enables angular misalignment of said transfer means and said propeller shaft means;
wherein said intermediate shaft means comprises an intermediate floating axial shaft roughly aligned with and axially spaced between said input shaft means and said propeller shaft means;
wherein said input shaft means has an axial end formed to a screw driver flat head tip configuration;
said intermediate shaft means has an axial end formed to a screw driver flat head tip configuration;
said first coupling means comprises an outer shell having a cross-shaped aperture with perpendicular crossed slots therethrough, said flat head tip of said input shaft means being loosely received in one of said crossed slots, and said flat head tip of said intermediate shaft means being loosely received in the other of said crossed slots,
such that rotation of said input shaft means drives said shell to rotate said shell which in turn drives said intermediate shaft means to rotate said intermediate shaft means, the looseness of said flat head tips in respective said cross slots permitting movement transverse to the axes of said rotation such that said input and intermediate shaft means may be angularly misaligned and also out of axial registry.

10. The invention according to claim 9 wherein one of said flat head tips is centrally notched and receives the other flat head tip therein, to reduce overall axial length.

11. An outboard marine propulsion system having a lower submerged housing including an electric motor and driving a propeller through a reducing traction drive comprising:
rotary input shaft means in said housing and rotated by said electric motor;
rotary intermediate shaft means in said housing;
rotary propeller shaft means in said housing and rotating said propeller;
first coupling means coupling said input shaft means to said intermediate shaft means such that said input shaft means drives said intermediate shaft means and enables different axes of rotation of said input and intermediate shaft means such that said input and intermediate shaft means need not be exactly aligned;
planet roller means around said intermediate shaft means and driven by rolling contact therewith;
transfer means driven by said roller means to rotate about said intermediate shaft means;
second coupling means coupling said propeller shaft means to said transfer means such that said transfer means drives said propeller shaft means and enables angular misalignment of said transfer means and said propeller shaft means,
wherein said intermediate shaft means comprises an intermediate floating axial shaft roughly aligned with and axially space between said input shaft means and said propeller shaft means,
and wherein said transfer means comprises a plurality of axial fingers having curved sides engaging said planet roller means and positioning and limiting movement of said transfer means, such that said transfer means takes its location from said planet roller means.

12. An outboard marind propulsion system having a lower submerged housing including an electric motor and driving a propeller through a reducing traction drive comprising:
rotary input shaft means in said housing and rotated by said electric motor;
rotary intermediate shaft means in said housing;
rotary propeller shaft means in said housing and rotating said propeller;
first coupling means coupling said input shaft means to said intermediate shaft means such that said input shaft means drives said intermediate shaft means and enables different axes of rotation of said input and intermediate shaft means such that said input and intermediate shaft means need not be exactly aligned;

planet roller means around said intermediate shaft means and driven by rolling contact therewith;

tranfer means driven by said roller means to rotate about said intermediate shaft means;

second coupling means coupling said propeller shaft means to said transfer means such that said transfer means drives said propeller shaft means and enables angular misalignment of said tranfer means and said propeller shaft means, wherein:

said intermediate shaft means comprises an intermediate floating axial shaft roughly aligned with and axially spaced between said input shaft means and said propeller shaft means;

said transfer means has an axial end with an axial opening therein and with a radial slot transverse to said axial opening;

said propeller shaft means has an axial end extending axially into said axial opening in said transfer means;

said second coupling means comprises a transverse pin extending radially from said axial end of said propeller shaft means and loosely into said radial slot in said transfer means, such that rotation of said transfer means drives said pin and said propeller shaft means to rotate the latter, the looseness of said pin in said radial slot permitting movement of said transfer means transverse to the axes of said rotation, such that said transfer means and said propeller shaft means may be angularly misaligned.

13. The invention according to claim 12 wherein said axial opeing in said transfer means has an inner rounded abutment surface, and said axial end of said propeller shaft means has a rounded end face engaging said rounded abutment surface such that said transfer means can rock about said rounded end face such that thrust from said propeller shaft means is transmitted through said transfer means to said roller means.

14. An outboard marine propulsion system having a lower submerged housing including an electric motor and driving a propeller through a reducing traction drive comprising:

rotary drive shaft means in said housing and rotated by said electric motor and comprising an axial shaft having axially spaced first and second raised shoulders of increased outer diameter of given keyed outer configuration;

first and second axially spaced race halves around said axial shaft and having an inner diameter and configuration keyed to respective said shoulders such that rotation of said axial shaft drives said race halves to rotate the latter and such that said race halves are rockable about said shoulders transverse to the axis of said rotation;

planet roller means around said axial shaft and driven by rolling contact with said first and second race halves, said transverse rocking of said race halves about said shoulders equalizing contact loading of said rolling contact of said planet roller means;

transfer means driven by said roller means to rotate about said axial shaft;

rotary propeller shaft means in said housing driven by said transfer means and rotating said propeller.

15. An outboard marine propulsion system having a lower submerged housing including an electric motor and driving a propeller through a reducing traction drive comprising:

rotary drive shaft means in said housing and rotated by said electric motor and comprising an axial shaft having axially spaced first and second raised shoulders of increased outer diameter of given keyed outer configuration;

first and second axially spaced race halves around said axial shaft and having an inner diameter and configuration keyed to respective said shoulders such that rotation of said axial shaft drives said race halves to rotate the latter and such that said race halves are rockable about said shoulders transverse to the axis of said rotation;

planet roller means around said axial shaft and driven by rolling contact with said first and second race halves;

transfer means driven by said roller means to rotate about said axial shaft;

rotary propeller shaft means in said housing driven by said transfer means and rotating said propeller;

outer race means fixed to one of said housing and said transfer means and concentric to and engaged by said roller means in rolling contact therewith;

axial loading means applying an axial force along said axial shaft urging said first race half toward said second race half to in turn urge said roller means radially outwardly against said outer race means;

end stop means on said axial shaft and engaging and stopping said second race half against said axial force from said axial loading means, said end stop means having a portion extending partially radially away from said axial shaft and partially axially toward said race halves to engage an outer spherical surface of said second race half along a tangent having a perpendicular vector intersecting the center of said axial shaft at said second shoulder, such that said second race half rocks about said second shoulder without causing axial movement of said end stop means and self-seats to said roller means to provide uniform rolling contact force and accommodate tolerance deviations.

16. The invention according to claim 15 wherein said axial loading means comprises one or more Belleville washers around said axial shaft and bearing on one side against stop means on said axial shaft and bearing on the other side against said first race half and applying a substantially constant axial force with axial deflection, to provide uniform contact force and accommodate tolerance deviations.

17. The invention according to claim 16 wherein said shoulders have an outer polygonal configuration.

18. An outboard marine propulsion system having a lower submerged housing including an electric motor and driving a propeller through a reducing traction drive comprising:

rotary drive shaft means in said housing and rotated by said electric motor and comprising an axial shaft having axially spaced first and second raised shoulders of increased outer diameter of given keyed outer configuration;

first and second axially spaced race halves around said axial shaft and having an inner diameter and configuration keyed to respective said shoulders such that rotation of said axial shaft drives said race halves to rotate the latter and such that said race halves are rockable about said shoulders transverse to the axis of said rotation;

planet roller means around said axial shaft and driven by rolling contact with said first and second race halves;

transfer means driven by said roller means to rotate about said axial shaft;

rotary propeller shaft means in said housing driven by said transfer means and rotating said propeller, wherein said roller means consists of three balls, and wherein each of said balls engages each of said race halves along said curved bearing surface and slightly elastically deforms over a given deformation length therealong and defines an angle of engagement tended by a first line drawn from the center of the ball to the center of said elastic deformation length and a second line extending from the center of the ball radially perpendicularly relative to said axial shaft, wherein said angle of engagement is in the range of about 5° to 30°.

19. The invention according to claim 18 wherein:

said center of said elastic deformation engagement of each of said balls with said first race half is radially aligned with said first shoulder;

said center of said elastic deformation engagement of each of said balls with said second race half is radially aligned with said second shoulder.

20. The invention according to claim 19 wherein said angle of engagement is substantially 20°.

21. An outboard marine propulsion system having a lower submerged housing including an electric motor and driving a propeller through a reducing traction drive comprising:

rotary drive shaft means in said housing and rotated by said electric motor and comprising an axial shaft having axially spaced first and second raised shoulders of increased outer diameter of given keyed outer configuration;

first and second axially spaced race halves around said axial shaft and having an inner diameter and configuration keyed to respective said shoulders such that rotation of said axial shaft drives said race halves to rotate the latter and such that said race halves are rockable about said shoulders transverse to the axis of said rotation;

planet roller means around said axial shaft and driven by rolling contact with said first and second race halves;

transfer means driven by said roller means to rotate about said axial shaft;

rotary propeller shaft means in said housing driven by said transfer means and rotating said propeller;

outer race means fixed to one of said housing and said transfer means and concentric to and engaged by said roller means in rolling contact therewith, and comprising axial loading means applying an axial force along said axial shaft urging said race halves toward each other to in turn urge said roller means radially outwardly against said outer race means, said axial loading means having a limited maximum loading force capability to intentionally provide overload slip protection to enable said axial shaft to continue to rotate even if rotation of said propeller shaft means is stopped, said continued rotation being enabled by sliding rather than rolling contact of said roller means.

22. The invention according to claim 21 wherein said axial loading means comprises means for applying a substantially constant axial force with axial deflection to accommodate axial tolerance deviations without substantially altering the radial loading of said roller means, to reduce manufacturing cost, to provide increased and uniform life by avoiding overly loaded roller means, to provide uniform overload slip capability, and to accommodate mechanical wear without a reduction of the radial loading of said roller means.

23. An outboard marine propulsion system having a lower submerged housing including an electric motor and driving a propeller through a reducing traction drive comprising:

rotary drive shaft means in said housing and rotated by said electric motor and comprising an axial shaft having axially spaced first and second raised shoulders of increased outer diameter of given keyed outer configuration;

first and second axially spaced race halves around said axial shaft and having an inner diameter and configuration keyed to respective said shoulders such that rotation of said axial shaft drives said race halves to rotate the latter and such that said race halves are rockable about said shoulders transverse to the axis of said rotation;

planet roller means around said axial shaft and driven by rolling contact with said first and second race halves;

transfer means driven by said roller means to rotate about said axial shaft;

rotary propeller shaft means in said housing driven by said transfer means and rotating said propeller;

outer race means fixed to said housing and concentric to and engaged by said roller means in rolling contact therewith, and wherein said roller means consists of three balls, and wherein said transfer means comprises cage means having three fingers extending axially between adjacent respective said balls and engaged and driven by said balls to rotate about said axial shaft.

24. The invention according to claim 23 wherein said three fingers have curved sides of substantially the same curvature as said balls and engaging said three balls and positioning and limiting movement of said cage means, such that said cage means takes its location from said three balls.

25. The invention according to claim 23 wherein said three fingers are joined by a hub having three abutment surfaces each between adjacent respective said fingers and each engaging a respective said ball such that said propeller thrust from said propeller shaft means is transmitted through said cage means substantially equally to said three balls.

26. An outboard marine propulsion system having a lower submerged housing including an electric motor and driving a propeller through a reducing traction drive comprising:

rotary drive shaft means in said housing and rotated by said electric motor and comprising an axial shaft having axially spaced first and second raised shoulders of increased outer diameter of given keyed outer configuration;

first and second axially spaced race halves around said axial shaft and having an inner diameter and configuration keyed to respective said shoulders such that rotation of said axial shaft drives said race halves to rotate the latter and such that said race halves are rockable about said shoulders transverse to the axis of said rotation;

planet roller means around said axial shaft and driven by rolling contact with said first and second race halves;

transfer means driven by said roller means to rotate about said axial shaft;

rotary propeller shaft means in said housing driven by said transfer means and rotating said propeller;

outer race means fixed to said transfer means and concentric to and engaged by said roller means in rolling contact therewith, and comprising means fixed to said housing and holding said roller means against orbiting about said axial shaft and allowing spinning of said roller means.

27. An outboard marine propulsion system having a lower submerged housing including an electric motor and driving a propeller through a reducing traction drive comprising:

rotary input shaft means in said housing and rotated by said electric motor and having an axial end formed to a screw driver flat head tip configuration;

rotary intermediate shaft means in said housing and having an axial end formed to a screw driver flat head tip configuration;

coupling means comprising an outer shell having a cross-shaped aperture with perpendicular crossed slots therethough, said flat head tip of said input shaft means being loosely received in one of said crossed slots, and said flat head tip of said intermediate shaft means being loosely received in the other of said crossed slots, such that rotation of said input shaft means drives said shell to rotate said shell which in turn drives said intermediate shaft means to rotate said intermediate shaft means, the looseness of said flat head tips of in respective said crossed slots permitting movement transverse to the axes of said rotation such that said input and intermediate shaft means need not be exactly aligned;

planet roller means around said intermediate shaft means and driven by rolling contact therewith;

transfer means driven by said roller means to rotate about said intermediate shaft means;

rotary propeller shaft means in said housing and driven by said transfer means and rotating said propeller.

28. The invention according to claim 27 wherein one of said flat head tips is centrally notched and receives the other flat head tip therein, to reduce overall axial length.

29. An outboard marine propulsion system having a lower submerged housing including an electric motor and driving a propeller through a reducing traction drive comprising:

rotary drive shaft means in said housing and rotated by said electric motor and comprising an axial shaft;

first and second axially spaced race halves around and driven by said axial shaft;

exactly three planet balls around said axial shaft and engaging said race halves at a total of six contact points, and driven by rolling contact with said race halves;

transfer means driven by said three balls to rotate around said axial shaft, said transfer means having an axial end with an axial opening therein having an inner rounded abutment surface;

rotary propeller shaft means in said housing driven by said transfer means and rotating said propeller and having an axial end with a rounded end face engaging said rounded abutment surface in said axial opening of said transfer means such that said transfer means rocks about said rounded end face of said propeller shaft means to provide equal division of propeller thrust load from said propeller shaft means among said three balls.

30. An outboard marine propulsion system having a lower submerged housing including an electric motor and driving a propeller through a reducing traction drive comprising:

rotary input shaft means in said housing and rotated by said electric motor;

rotary intermediate floating shaft means in said housing:

means coupling said input shaft means to said intermediate shaft means such that said input shaft means drives said intermediate shaft means and enables different axes of rotation of said input and intermediate shaft means and enables angular misalignment of said input and intermediate shaft means such that said input and intermediate shaft means need not be exactly aligned;

first and second axially spaced race halves around and driven by said intermediate floating shaft means;

exactly three planet balls around said intermediate floating shaft means and engaging said race halves at a total of six contact points, and driven by rolling contact with said race halves;

transfer means driven by said three balls to rotate about said intermediate floating shaft means;

rotary propeller shaft means driven by said transfer means and rotating said propeller.

31. The invention according to claim 30 comprising means keying said first and second race halves to said intermediate floating shaft means and including rocking means enabling said race halves to rock about said intermediate floating shaft means transversely to the axis of rotation, to provide uniform and self-corrective seating of said race halves on the three balls and to provide equal contact pressure among said six contact points.

32. The invention according to claim 30 comprising second coupling means coupling said propeller shaft means to said transfer means such that said transfer means drives said propeller shaft means and enables different axes of rotation of said transfer means and said propeller shaft means.

33. An outboard marine propulsion system having a lower submerged housing including an electric motor and driving a propeller through a reducing traction drive comprising:

rotary drive shaft means in said housing rotated by said electric motor and comprising an axial shaft;

first and second axially spaced race halves around and driven by said axial shaft;

exactly three planet balls around said axial shaft and driven by rolling contact with said race halves;

transfer means driven by said three balls to rotate about said axial shaft;

outer race means fixed to one of said housing and said transfer means and concentric to and engaged by said three balls in rolling contact therewith;

rotary propeller shaft means in said housing driven by said transfer means and rotating said propeller;

axial loading means applying an axial force along said axial shaft urging said race halves towards each other to in turn urge said three balls radially outwardly against said outer race means, said axial loading means having a limited maximum loading force capability to intentionally provide overload slip protection to enable said rotary drive shaft means to continue to rotate even if rotation of said propeller shaft means and said propeller is stopped, said continued rotation being enabled by sliding rather than rolling contact of said three balls.

34. The invention according to claim 33 wherein said axial loading means includes means applying a substantially constant axial force with axial deflection to accommodate axial tolerance deviations without substantially altering the radial loading of said three balls, to reduce manufacturing cost, to provide increased and uniform life by avoiding overly loaded said three balls, to provide uniform overload slip capability, and to accommodate mechanical wear without a reduction of the radial loading of said three balls.

35. The invention according to claim 33 wherein each of said three balls engages each of said first and second race halves along a curved bearing surface and slightly elastically deforms over a given deformation length therealong and defines an angle of engagement defined by a first line drawn from the center of the ball to the center of said elastic deformation length and a second line extending from the center of the ball radially perpendicularly relative to said axial shaft, wherein said angle of engagement is substantially 20°.

36. A transmission having a motive drive input driving a driven output through a traction drive comprising:
rotary input shaft means rotated by said motive drive input;
rotary intermediate shaft means;
rotary output shaft means rotating said driven output;
first coupling means coupling said input shaft means to said intermediate shaft means such that said input shaft means drives said intermediate shaft means and enables different axes of rotation of said input and intermediate shaft means such that said input and intermediate shaft means need not be exactly aligned;
planet roller means around said intermediate shaft means and driven by rolling contact therewith;
transfer means driven by said roller means to rotate about said intermediate shaft means;
second coupling means coupling said output shaft means to said transfer means such that said transfer means drives said output shaft means and enables angular misalignment of said transfer means and said output shaft means,
wherein said intermediate shaft means comprises an intermediate floating axial shaft roughly aligned with and axially spaced between said input shaft means and said output shaft means,
and comprising outer race means engaged by said roller means in rolling contact therewith, and wherein said intermediate shaft means comprises first and second inner race halves keyed to and driven by said floating axial shaft and axially spaced along said floating axial shaft and having curved bearing surfaces engaging said roller means in rolling contact therewith and applying increasing radially outward loading of said roller means against said outer race means with decreasing axial separation between said first and second inner race halves, and comprising axial loading means applying an axial force along said floating axial shaft urging said first and second inner race halves towards each other to in turn urge said roller means radially outwardly against said outer race means, said axial loading means having a limited maximum loading force capability to intentionally provide overload slip protection to enable said input shaft means and said floating axial shaft to continue to rotate even if rotation of said output shaft means is stopped, said continued rotation being enabled by sliding rather than rolling contact of said roller means.

37. The invention according to claim 36 wherein said axial loading means comprises one or more Belleville washers around said intermediate floating axial shaft and bearing on one side against stop means on said floating axial shaft and bearing on the other side against said first inner race half and applying a substantially constant axial force with axial deflection to accommodate axial tolerance deviations without substantially altering the radial loading of said roller means.

38. The invention according to claim 37 wherein said input shaft means has an axial end formed to screw driver flat head tip configuration, said intermediate shaft means has an axial end formed to a screw driver flat head tip configuration, said first coupling means comprises an outer shell having a cross-shaped aperture with perpendicular crossed slots therethrough, said flat head tip of said input shaft means being loosely received in one of said crossed slots, said flat head tip of said intermediate shaft means being loosely received in the other of said crossed slots, wherein one of said flat head tips is centrally notched and receives the other flat head tip therein, such that rotation of said input shaft means drives said shell to rotate said shell which in turn drives said intermediate shaft means.

39. A transmission having a motive drive input driving a driven output through a traction drive comprising:
rotary input shaft means rotated by said motive drive input;
rotary intermediate shaft means;
rotary output shaft means rotating said driven output;
first coupling means coupling said input shaft means to said intermediate shaft means such that said input shaft means drives said intermediate shaft means and enables different axes of rotation of said input and intermediate shaft means such that said input and intermediate shaft means need not be exactly aligned;
planet roller means around said intermediate shaft means and driven by rolling contact therewith;
transfer means driven by said roller means to rotate about said intermediate shaft means;
second coupling means coupling said output shaft means to said transfer means such that said transfer means drives said output shaft means and enables angular misalignment of said transfer means and said output shaft means,
wherein said intermediate shaft means comprises an intermediate floating axial shaft roughly aligned with and axially spaced between said input shaft means and said output shaft means,
and wherein said transfer means comprises a plurality of axial fingers having curved sides engaging said planet roller means and positioning and limiting movement of said transfer means, such that said transfer means takes its location from said planet roller means.

40. A transmission having a motive drive input driving a driven output through a traction drive comprising:
rotary input shaft means rotated by said motive drive input;
rotary intermediate shaft means;
rotary output shaft means rotating said driven output;

first coupling means coupling said input shaft means to said intermediate shaft means such that said input shaft means drives said intermediate shaft means and enables different axes of rotation of said input and intermediate shaft means such that said input and intermediate shaft means need not be exactly aligned;

planet roller means around said intermediate shaft means and driven by rolling contact therewith;

transfer means driven by said roller means to rotate about said intermediate shaft means;

second coupling means coupling said output shaft means to said transfer means such that said transfer means drives said output shaft means and enables angular misalignment of said transfer means and said output shaft means, wherein said intermediate shaft means comprises an intermediate floating axial shaft roughly aligned with and axially spaced between said input shaft means and said output shaft means, and wherein said transfer means has an axial end with an axial opening therein and with a radial slot transverse to said axial opening, said rotary output shaft means has an axial end extending axially into said axial opening in said transfer means, said second coupling means comprises a transverse pin extending radially from said axial end of said rotary output shaft means and loosely into said radial slot in said transfer means, such that rotation of said transfer means drives said pin and said rotary output shaft means to rotate the latter.

41. A transmission having a motive drive input driving a driven output through a traction drive comprising:
rotary drive shaft means rotated by said motive drive input and comprising an axial shaft having axially spaced first and second raised shoulders of increased outer diameter of given keyed outer configuration;
first and second axially spaced race halves around said axial shaft and having an inner diameter and configuration keyed to respective said shoulders such that rotation of said axial shaft drives said race havles to rotate the latter and such that said race havles are rockable about said shoulders transverse to the axis of said rotation;
planet roller means around said axial shaft and driven by rolling contact with said first and second race halves, said transverse rocking of said race halves about said shoulders equalizing contact loading of said rolling contact of said planet roller means;
transfer means driven by said roller means to rotate about said axial shaft;
rotary output shaft means driven by said transfer means and rotating said driven output.

42. A transmission having a motive drive input driving a driven output through a traction drive comprising:
rotary drive shaft means rotated by said motive drive input and comprising an axial shaft having axially spaced first and second raised shoulders of increased outer diameter of given keyed outer configuration;
first and second axially spaced race halves around said axial shaft and having an inner diameter and configuration keyed to respective said shoulders such that rotation of said axial shaft drives said race havles to rotate the latter and such that said race havles are rockable about said shoulders transverse to the axis of said rotation;
planet roller means around said axial shaft and driven by rolling contact with said first and second race halves;
transfer means driven by said roller means to rotate about said axial shaft;
rotary output shaft means driven by said transfer means and rotating said driven output;
outer race means concentric to and engaged by said roller means in rolling contact therewith, axial loading means applying an axial force along said axial shaft urging said first race half toward said second race half to in turn urge said roller means radially outwardly against said outer race means, end stop means on said axial shaft and engaging and stopping said second race half against said axial force from said axial loading means, said end stop means having a portion extending partially radially away from said axial shaft and partially axially toward said race halves to engage an outer spherical surface of said second race half along a tangent having a perpendicular vector intersecting the center of said axial shaft at said second shoulder, such that said second race half racks about said second shoulder without causing axial movement of said end stop means and self-seats to said roller means to provide uniform rolling contact force and accommodate tolerance deviations.

43. The invention according to claim 42 wherein in said axial loading means comprises one or more Belleville washers around said axial shaft and bearing on one side against stop means on said axial shaft and bearing on the other side against first race half and applying a substantially constant axial force with axial deflection.

44. The invention according to claim 42 wherein said roller means consists of three balls, and wherein each of said balls engages each of said race halves along said curved bearing surface and slightly elastically deforms over a given deformation length therealong and defines an angle of engagement tended by a first line drawn from the center of the ball to the center of said elastic deformation length and a second line extending from the center of the ball radially perpendicularly relative to said axial shaft, wherein said angle of engagement is in the range of about 5° to 30°, and wherein said center of said elastic deformation engagement of each of said balls with said first race half is radially aligned with said first shoulder, and wherein said center of said elastic deformation engagement of each of said balls with said second race half is radially aligned with said second shoulder.

45. A transmission having a motive drive input driving a driven output through a traction drive comprising:
rotary drive shaft means rotated by said motive drive input and comprising an axial shaft having axially spaced first and second raised shoulders of increased outer diameter of given keyed outer configuration;
first and second axially spaced race halves around said axial shaft and having an inner diameter and configuration keyed to respective said shoulders such that rotation of said axial shaft drives said race havles to rotate the latter and such that said race havles are rockable about said shoulders transverse to the axis of said rotation;
planet roller means around said axial shaft and driven by rolling contact with said first and second race halves;

transfer means driven by said roller means to rotate about said axial shaft;

rotary output shaft means driven by said transfer means and rotating said driven output;

outer race means engaged by said roller means in rolling contact therewith, and comprising axial loading means applying an axial force along said axial shaft urging said race halves toward each other to in turn urge said roller means radially outwardly against said outer race means, said axial loading means having a limited maximum loading force capability to intentionally provide overload slip protection to enable said axial shaft to continue to rotate even if rotation of said output shaft means is stopped.

46. The invention according to claim 45 wherein said axial loading means comprises means for applying a substantially constant axial force with axial deflection to accommodate axial tolerance deviations without substantially altering the radial loading of said roller means, and wherein said roller means consists of three balls, and wherein said transfer means comprises cage means having three fingers extending axially betwen adjacent respective said balls and engaged and driven by said balls to rotate about said axial shaft, wherein said three fingers are joined by a hub having three abutment surfaces each between adjacent respective said fingers and each engaging a respective said ball such that thrust from said driven output is transmitted through said cage means substantially equally to said three balls.

47. A transmission having a motive drive input driving a driven output through a traction drive comprising:

rotary input shaft means rotated by said motive drive input and having an axial end formed to a screw driver flat head tip configuration;

rotary intermediate shaft means having an axial end formed to a screw driver flat head tip configuration;

coupling means comprising an outer shell having a cross-shaped aperture with perpendicular crossed slots therethrough, said flat head tip of said input shaft means being loosely received in one of said crossed slots, and said flat head tip of said intermediate shaft means being loosely reeived in the other of said crossed slots, such that rotation of said input shaft means drives said shell to rotate said shell which in turn drives said intermediate shaft means to rotate said intermediate shaft means;

planet roller means around said intermediate shaft means and driven by rolling contact therewith;

transfer means driven by said roller means to rotate about said intermediate shaft means;

rotary output shaft means driven by said transfer means and rotating said driven output.

48. The invention according to claim 47 wherein one of said flat head tips is centrally notched and receives the other flat head tip therein, to reduce overall axial length.

49. A transmission having a motive drive input driving a driven output through a traction drive comprising:

rotary drive shaft means rotated by said motive drive input and comprising an axial shaft;

first and second axially spaced race halves around and driven by said axial shaft;

exactly three planet balls around said axial shaft and engaging said race halves at a total of six contact points, and driven by rolling contact with said race halves;

transfer means driven by said three balls to rotate about said axial shaft, said transfer means having an axial end with an axial opening therein having an inner rounded abutment surface;

rotary output shaft means driven by said transfer means and rotating said driven output and having an axial end with a rounded end face engaging said rounded abutment surface in said axial opening of said transfer means such that said transfer means rocks about said rounded end face of said rotary output shaft means to provide equal division of thrust load from said driven output among said three balls.

50. A transmission having a motive drive input driving a driven output through a traction drive comprising:

rotary input shaft means rotated by said motive drive input;

rotary intermediate floating shaft means;

means coupling said input shaft means to said intermediate shaft means such that said input shaft means drives said intermediate shaft means, and enabling different axes of rotation of said input and intermediate shaft means;

first and second axially spaced race halves around and driven by said intermediate floating shaft means;

exactly three planet balls around said intermediate floating shaft means and engaging said race halves at a total of six contact points, and driven by rolling contact with said race halves;

transfer means driven by said three balls to rotate about said intermediate floating shaft means;

rotary output shaft means driven by said transfer means and rotating said driven output.

51. The invention according to claim 50 comprising means keying said first and second race halves to said intermediate floating shaft means and including rocking means enabling said race halves to rock about said intermediate floating shaft means transversely to the axis of rotation, to provide uniform and self-corrective seating of said race halves on the three balls and to provide equal contact pressure among said six contact points.

52. The invention according to claim 50 comprising second coupling means coupling said output shaft means to said transfer means such that said transfer means drives said driven output and enables different axes of rotation of said transfer means and said driven output.

53. A transmission having a motive drive input driving a driven output through a traction drive comprising:

rotary drive shaft means rotated by said motive drive input and comprising an axial shaft;

first and second axially spaced race halves around and driven by said axial shaft;

exactly three planet balls around said axial shaft and driven by rolling contact with said race halves;

transfer means driven by said three balls to rotate about said axial shaft;

outer race means concentric to and engaged by said roller means in rolling contact therewith;

rotary output shaft means driven by said transfer means and rotating said driven output;

axial loading means applying an axial force along said axial shaft urging said race halves towards each other to in turn urge said three balls radially outwardly against said outer race means, said axial loading means having a limited maximum loading force capability to intentionally provide overload slip protection to enable said rotary drive shaft means to continue to rotate even if rotation of said output shaft means and said driven output is stopped, said continued rotation being enabled by sliding rather than rolling contact of said three balls.

54. The invention according to claim 53 wherein said axial loading means includes means applying a substantially constant axial force with axial deflection to accommodate axial tolerance deviations without substantially altering the radial loading of said three balls.

55. The invention according to claim 53 wherein each of said three balls engages each of said first and second race halves along a curved bearing surface and slightly elastically deforms over a given deformation length therealong and defines an angle of engagement defined by a first line drawn from the center of the ball to the center of said elastic deformation length and a second line extending from the center of the ball radially perpendicularly relative to said axial shaft, wherein said angle of engagement is substantially 20°.

* * * * *